United States Patent [19]

Wright et al.

[11] Patent Number: 5,645,384

[45] Date of Patent: Jul. 8, 1997

[54] RECEPTACLE FOR QUICK-RELEASE FASTENER

[75] Inventors: Andrew Charles Walden Wright, Surry; Derrin John Bond, Hampshire, both of United Kingdom

[73] Assignee: Dzus Fastener Europe Limited, Farnham, United Kingdom

[21] Appl. No.: 601,727

[22] Filed: Feb. 15, 1996

[30] Foreign Application Priority Data

Feb. 17, 1995 [GB] United Kingdom ............... 9503153

[51] Int. Cl.[6] .................... F16B 37/02; F16B 37/04
[52] U.S. Cl. .................... 411/174; 411/182; 411/554
[58] Field of Search ........................ 411/173, 174, 411/175, 182, 525, 526, 527, 554, 555

[56] References Cited

U.S. PATENT DOCUMENTS

| | | | |
|---|---|---|---|
| 2,686,548 | 8/1954 | Murphy | 411/173 |
| 2,719,558 | 10/1955 | Tinnerman | 411/173 |
| 4,202,390 | 5/1980 | Schenk . | |
| 4,333,211 | 6/1982 | Gunther | 411/554 |
| 4,610,588 | 9/1986 | Van Buren, Jr. et al. | 411/527 X |
| 4,677,714 | 7/1987 | Wright | 411/182 X |

FOREIGN PATENT DOCUMENTS

| | | | |
|---|---|---|---|
| 0348064 | 12/1989 | European Pat. Off. . | |
| 2356035 | 1/1978 | France . | |
| 2292509 | 12/1990 | Japan | 411/173 |
| 588744 | 1/1944 | United Kingdom . | |

Primary Examiner—Neill R. Wilson
Attorney, Agent, or Firm—Hoffmann & Baron

[57] ABSTRACT

A one-part, front mounted receptacle 1 for a quick release fastener has a first element 11 which provides a retention mechanism 12 for engaging and retaining a stud of the fastener. A second element 16 having a pair of flexible elongate components 17 is spaced from the first by a bight portion 14 and has a pair of transverse tabs 19 disposed adjacent the bight portion. These are adapted to engage one face 33 of a support 30, in an aperture 31 of which the receptacle is mounted. In use, the bight portion 14 engages the other face 32. A third element 20 is disposed at the opposite end of the second element 16 from the bight portion 14 and has a flexible barb portion 23 arranged to flex on insertion of the receptacle in the aperture and to engage the other face after insertion in order to retain the receptacle in the aperture.

12 Claims, 4 Drawing Sheets

5,645,384

1

RECEPTACLE FOR QUICK-RELEASE FASTENER

BACKGROUND OF THE INVENTION

The present invention relates to a receptacle for a quick-release fastener of the type having a stud and receptacle, one of the stud and receptacle having a cam slot or cam slots cooperating with a cross bar, tab or tabs on the other to provide a locking action as the cross bar or tab(s) moves between the first and second positions along the cam slot. Such fasteners are well known, for example, see EP-A-0094150.

Fasteners such as that referred to above are usually used to connect a panel or like member to a support member with the stud being held for rotation in an aperture in the panel and the receptacle being held in substantially fixed position in an aperture in the support. Many fasteners of the general type have a receptacle which requires to be fitted from the rear of the support, ie. on the side opposite the panel, but receptacles have been proposed which can be inserted from the front. Insertion from the front simplifies the assembly process and, in certain cases, where there is no access to the rear of the support, may be essential. Such front-mounted receptacles may comprise either a one-part receptacle for simplicity, or a multiple-part receptacle which may be intended to accommodate thickness variations in the support, for example. Examples of such fasteners are to be found in U.S. Pat. No. 4 202 390, GB-A-558 744 & FR-A-2 356 035.

One part front-mounted receptacles, generally tend to be too stiff to be fitted easily and allow very little accommodation of thickness variation whereas multiple-part devices, whilst overcoming these problems, are generally more expensive to manufacture as they comprise multiple parts.

EP-A-0348064 overcomes these problems in large measure, in a two-part front mounted receptacle. However, there is still a need for a one-part receptacle providing for thickness variations in the support and simple construction.

SUMMARY OF THE INVENTION

According to a first aspect of the present invention there is provided a one-part, front mounted receptacle for a quick-release fastener, the receptacle having a first element comprising a retention mechanism for engaging and retaining in use a stud of the fastener connected therewith; a second element spaced from the first by a bight portion, the second element comprising a pair of flexible elongate components, and a pair of transverse tabs disposed adjacent the bight portion and being adapted to engage one face of a support in an aperture of which the receptacle is mounted in use, the bight portion engaging the other face in use; and, a third element disposed at the opposite end of the second element from the bight portion and having a flexible barb portion arranged to flex on insertion of the receptacle in the aperture and to engage the other face thereafter, in order to retain the receptacle in the aperture.

The third portion preferably comprises a pair of depending arms, one extending from each of the elongate components of the second portion and the barb portion extends outwardly therefrom in a direction away from the bight portion.

Preferably, the barb portion includes a leg having a first limb extending outwardly in the direction away from the bight portion and a second limb carried by the first limb and extending towards the bight portion. The junction between the two limbs may be curved in two planes so as to provide for a smooth engagement of the barb portion with the other face of the support, to prevent damage to the face.

The bight portion is preferably attached to the second portion by a lazy-S shaped curved portion to provide a shoulder to engage one side of the aperture on installation of the receptacle.

Disposing the transverse tabs adjacent to the bight portion allows the top surface of the receptacle to be sufficiently long to allow flexing during installation and thus accommodation of a modest range of support thicknesses. Spacing the bight portion from the second portion and providing a shoulder to engage one side of the aperture contributes to the ability of the receptacle to be installed and accommodate support thickness ranges.

According to a second aspect of the invention, there is provided a one-part, front mounted receptacle for a quick-release fastener, the receptacle having a first element comprising a retention mechanism for engaging and retaining in use a stud of the fastener connected therewith; a second element spaced from the first by a bight portion, the second element having a pair of transverse tabs disposed adjacent the bight portion and being adapted to engage one face of a support in an aperture of which the receptacle is mounted in use, the bight portion engaging the other face in use; and, a third element disposed at the opposite end of the second element from the bight portion and having a flexible barb portion arranged to flex on insertion of the receptacle in the aperture and to engage the other face thereafter, in order to retain the receptacle in the aperture, the barb portion including a leg having a first limb extending outwardly in the direction away from the bight portion and a second limb carried by the first limb and extending towards the bight portion.

By providing the barb portion with a second limb which extends towards the bight portion, additional guiding can be provided for the stud as it is inserted into the receptacle, the side of the stud engaging the free end of the limb.

BRIEF DESCRIPTION OF THE DRAWINGS

Two examples of receptacles constructed in accordance with the present invention will now be described with reference to the accompanying drawings in which.

DETAILED DESCRIPTION OF THE INVENTION

Figure 1:
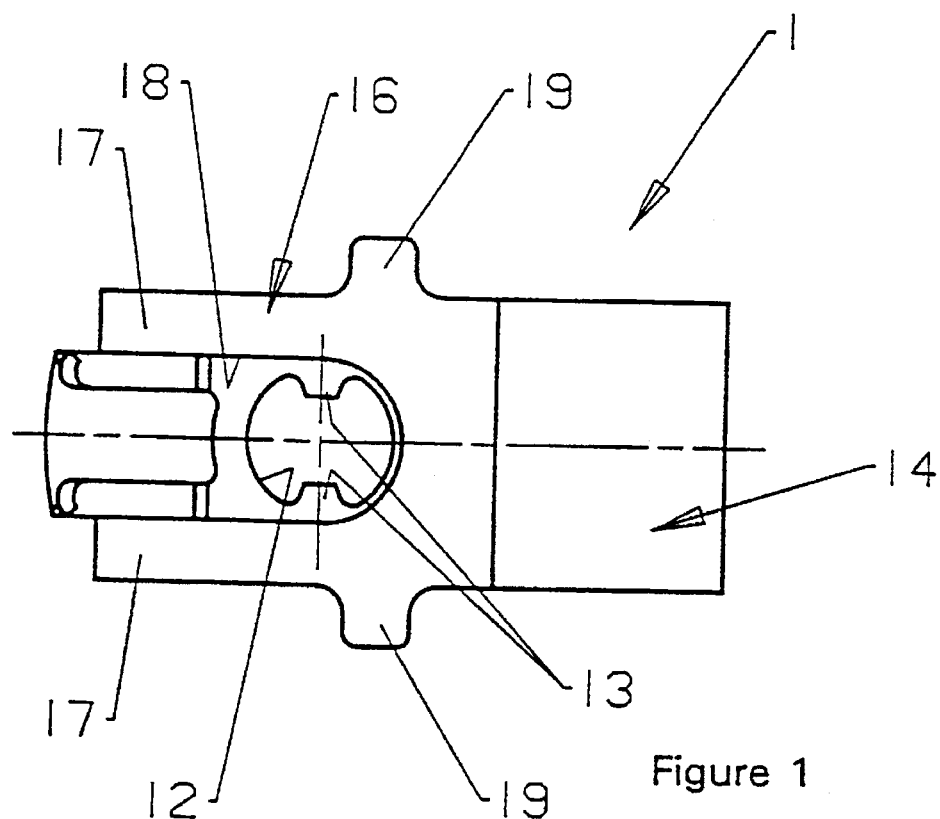
FIG. 1 is a plan view of the first receptacle.

The first and second receptacles shown in, respectively, FIGS. 1 to 4 and FIGS. 5 to 8 are substantially similar and the same reference numerals are used below for convenience.

Figure 2:
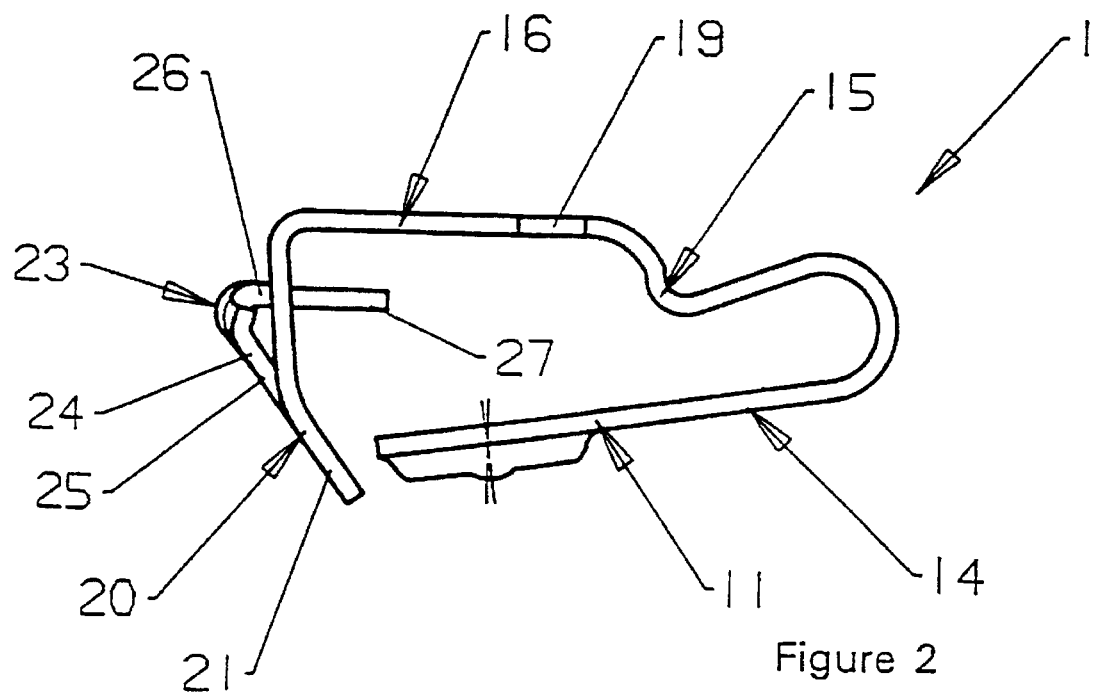
FIG. 2 is a side view of the first receptacle.
Figure 3:
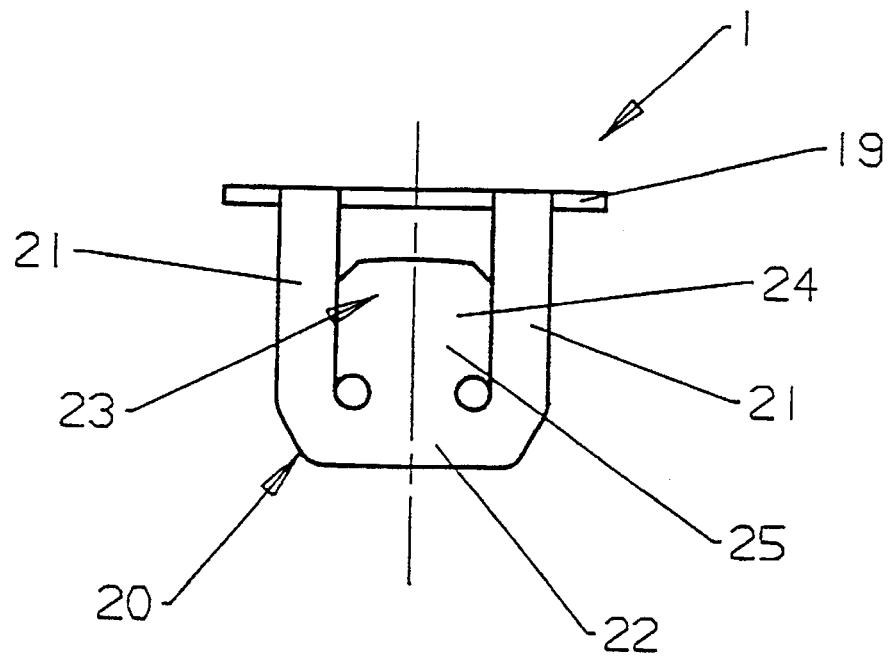
FIG. 3 is an end view of the first receptacle.
Figure 4:
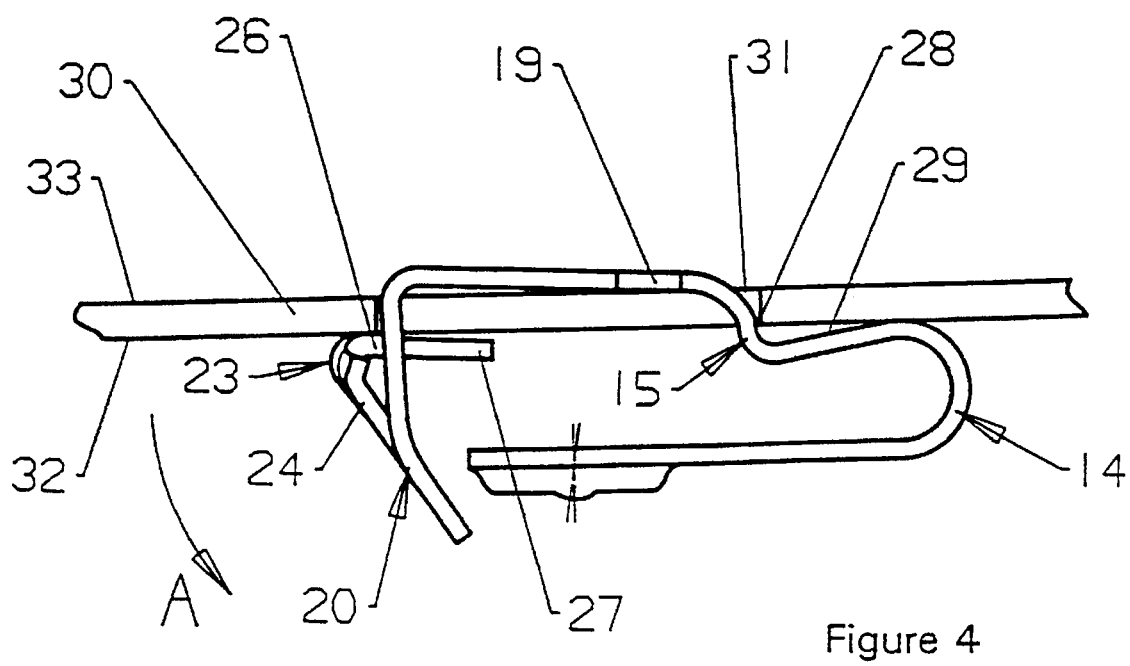
FIG. 4 is a further side view showing the first receptacle in the installed position.
Figure 5:
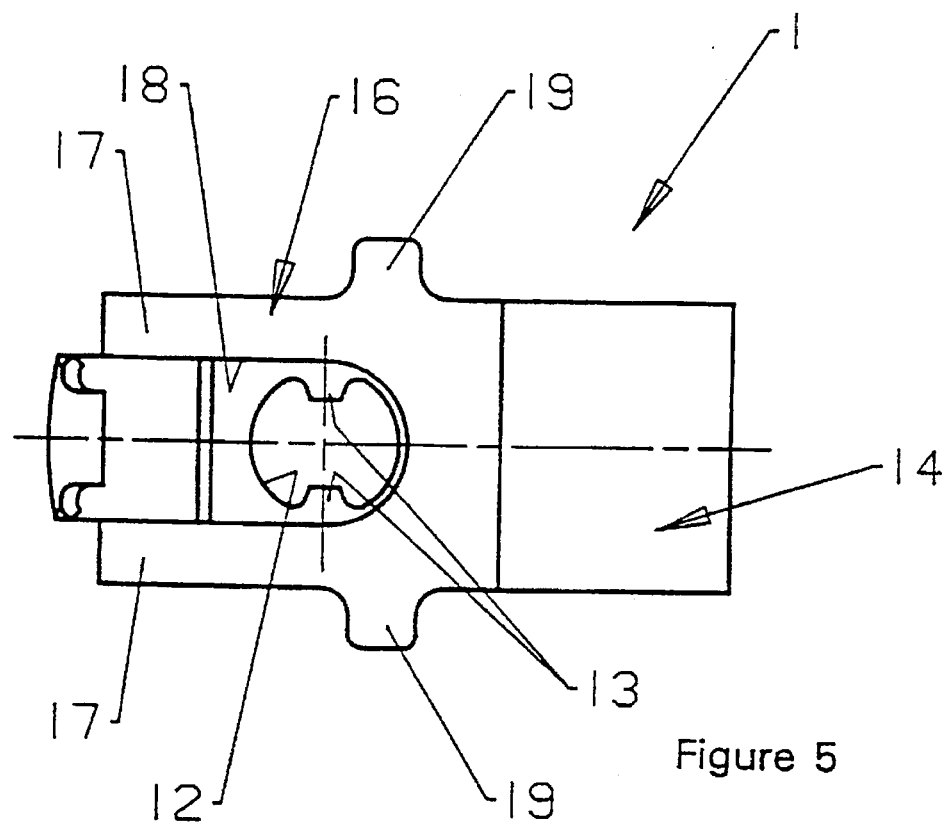
FIG. 5 is a plan view of the second receptacle.

Considering first, the receptacle of FIGS. 1 to 4, the receptacle 1 is formed of spring steel and has a first element 11 which is substantially planar and which carries a stud retention mechanism provided, in this example, by an aperture 12 having a pair of inwardly directed and oppositely opposed tabs 13 which, in use, engage with respective cam slots in a fastener stud (not shown). Such a retention mechanism is well known in the art, see for example EP-A-0348064, and therefore will not be described further. A generally U-shaped bight portion 14 is formed integrally with the first element 11 (as best seen in FIG. 2) and connects, via a lazy-S shaped portion 15, with a second element 16. The bight portion 14 and lazy-S shaped portion 15 thus space the first and second elements apart from one another.

The second element 16 is generally U-shaped in plan view (see FIG. 1), thus providing a pair of flexible elongate components 17 around a generally U-shaped aperture 18. The second element 16 also provides a pair of transversely extending tabs 19.

At the end of the second element remote from the bight portion 14, a third element 20 is integrally formed and comprises a pair of depending arms 21, each of which extends directly from an end of a respective one of the flexible components 17 of the second element 16. At the other end, each of the arms 21 is connected to a bridging part 22 which, in turn, carries a barb portion 23 in the form of a leg 24 having a first limb 25 connected to the bridging part 22 and a second limb 26 turned inwardly and extending towards the bight portion 14. The free end 27 of the limb 26 provides, in use, a guide for the stud during its insertion through the U-shaped slot 18 and into the retainer aperture 12. As shown in the Figures, the junction between the two limbs 25, 26 of the leg 24 is curved in two planes so as to provide a rounded surface providing for smooth engagement of the barb portion during insertion of the receptacle as described below.

The lazy-S shaped portion 15, provides, in use, a shoulder 28, adjacent the bight portion 14, on the side of the receptacle which is inserted first through an aperture 31 in a support 30 on which the receptacle 1 is to be attached. The bight portion 14 is inserted first through the aperture 31 with the shoulder 28 engaging against one end of the aperture and the receptacle is then rotated (in the direction of the arrow A shown in FIG. 4) so that the third element 20 passes through the aperture 31, the leg 24 of the barb 23 flexing inwardly as the third element 20 is pushed through the aperture. Once the movement has proceeded far enough, the barb flexes again in the opposite direction so that the second limb 26 comes to lie, partly against the rear face 32 of the support 30. The tabs 19 engage the top surface 33 of the support 30 on each side of the aperture 31. The top surface 29 (as seen in the figures) of the bight portion 14 engages the rear surface 32 of the support 30 so that a secure fixing of the receptacle 1 in the aperture 31 is achieved.

The two elongate components 17 of the first element 16 are able to flex to accommodate different thickness of support 30 as are the lazy-S shaped portion 15 and the barb 23.

Once the receptacle has been securely fitted in the aperture in the support it is ready for use.

Figure 6:
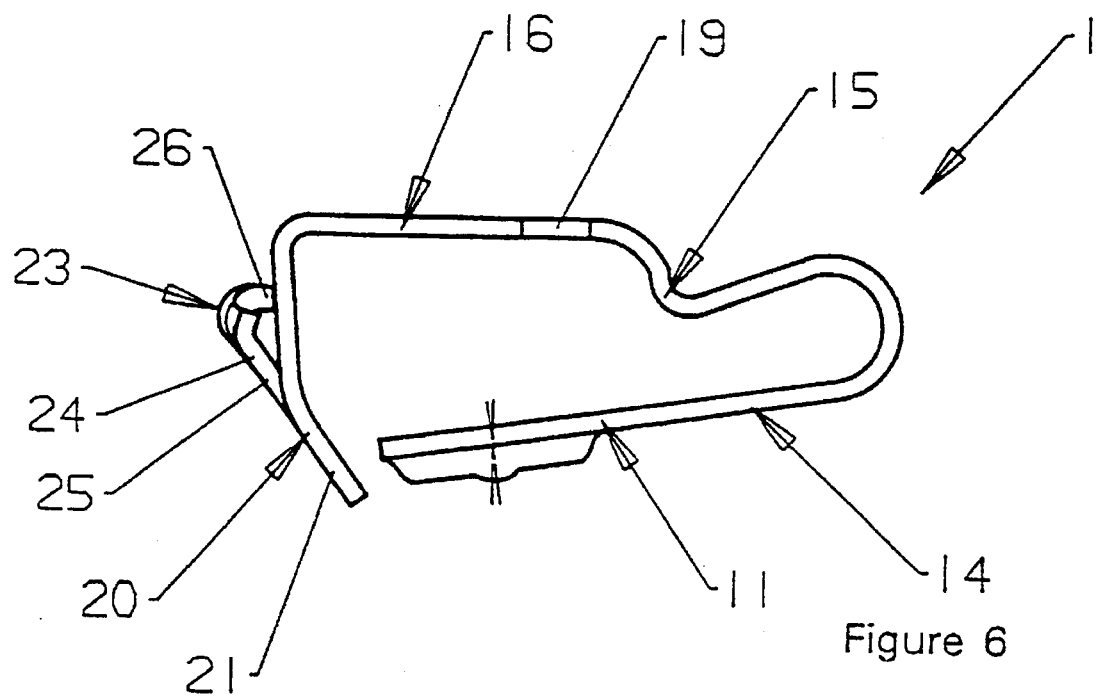
FIG. 6 is a side view of the second receptacle.
Figure 7:
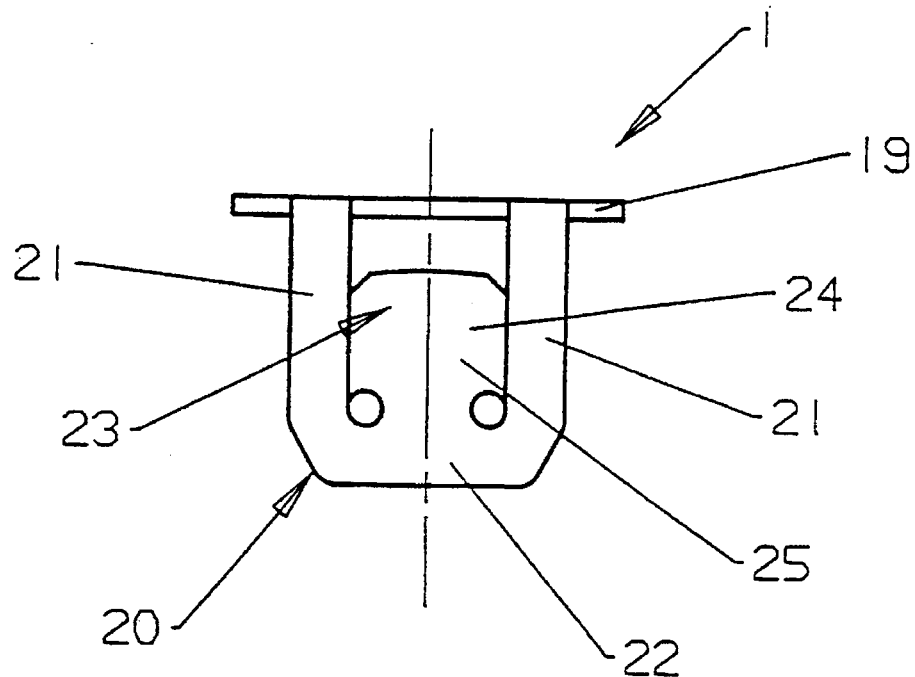
FIG. 7 is an end view of the second receptacle.
Figure 8:
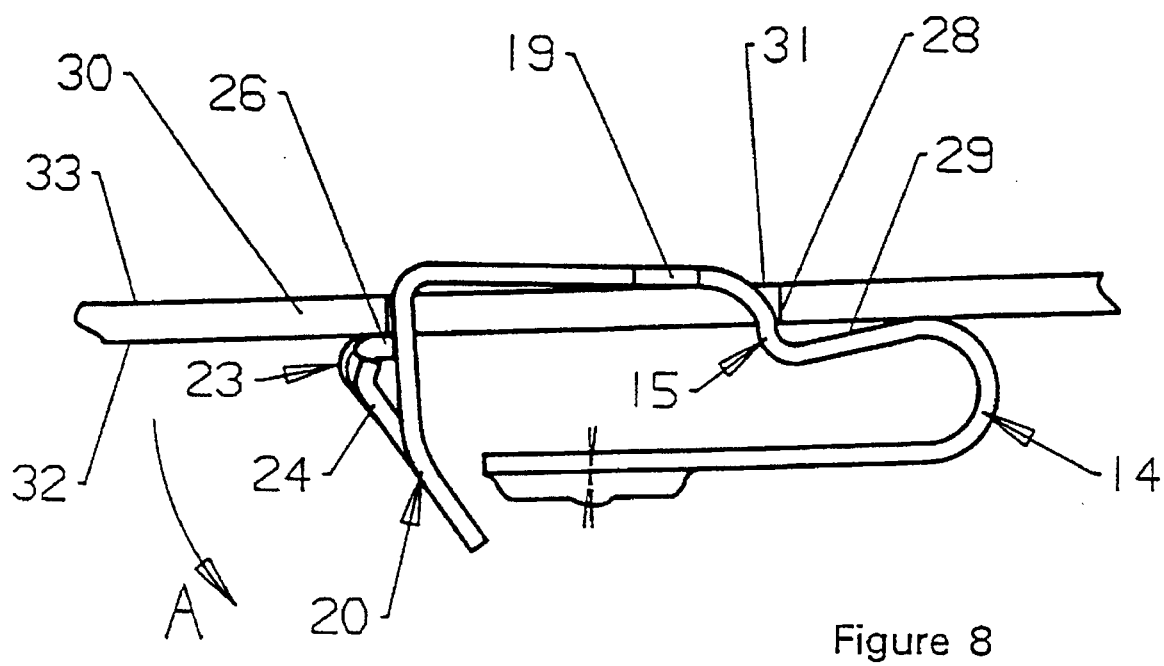
FIG. 8 is a further side view showing the second receptacle in the installed position.

The second receptacle, shown in FIGS. 5 to 8, is substantially identical to the first, except that the barb portion 23 has a shorter second limb 26 (see FIG. 6).

We claim:

1. A one-part receptacle of a quick-release fastener for from mounting in a support, said support having a front and rear face, and an aperture therethrough in which said receptacle is mounted in use, said receptacle comprising:

a substantially planar first element, said first element comprising a retention mechanism for engaging and retaining in use a stud of said fastener connected therewith;

a generally U-shaped bight portion;

a substantially planar second element, said bight position being disposed between said first and second elements to connect said elements and to space said second element from said first element, said second element comprising a pair of flexible elongate components, and a pair of transverse tabs disposed adjacent said bight portion, said tabs being adapted to engage said front face of said support and said bight portion engaging said rear face in use; and, a depending third element, said third element connected to said second element and being disposed at the opposite end of said second element from said bight portion and having a flexible barb portion adapted to flex on insertion of said receptacle in said aperture and to engage said rear face thereafter, in order to retain said receptacle in said aperture.

2. A receptacle according to claim 1, wherein said third element comprises a pair of depending arms, wherein one of each of said arms extends from each of said elongate components of said second portion, and wherein said barb portion extends outwardly therefrom in a direction away from said bight portion.

3. A receptacle according to claim 1, wherein said barb portion includes a leg, said leg having a first limb extending outwardly in the direction away from said bight portion, and a second limb carried by said first limb and extending towards said bight portion.

4. A receptacle according to claim 3, wherein said limbs have a junction and wherein said junction between said two limbs of said barb portion is curved in two planes so as to provide for a smooth engagement of said barb portion with the other face of said support, to prevent damage to said face.

5. A receptacle according to claim 1, further including a lazy-S shaped curved portion and wherein said bight portion is attached to said second portion by said lazy-S shaped curved portion to provide a shoulder to engage one side of said aperture on installation of said receptacle.

6. A receptacle according to claim 3, wherein said second limb of said barb portion is adapted to provide a free end forming a guide surface for said stud.

7. A one-part receptacle of a quick-release fastener for front mounting in a support, said support having a front and rear face, and an aperture therethrough in which said receptacle is mounted in use, said receptacle comprising:

a substantially planar first element, said first element comprising a retention mechanism for engaging and retaining in use a stud of said fastener connected therewith;

a generally U-shaped bight portion;

a substantially planar second element, said bight position being disposed between said first and second elements to connect said elements and to space said second element from said first element, said second element comprising a pair of transverse tabs disposed adjacent said bight portion, said tabs being adapted to engage said from face of said support and said bight portion engaging the rear face in use; and, a depending third element, said third element connected to said second element and being disposed at the opposite end of said second element from said bight portion and having a flexible barb portion adapted to flex on insertion of said receptacle in said aperture and to engage said other face thereafter, in order to retain said receptacle in said aperture, said barb portion including a leg having a first limb extending outwardly in the direction away from said bight portion and a second limb carded by said first limb and extending towards said bight portion.

8. A receptacle according to claim 7, wherein said third element comprises a pair of depending arms, wherein one of each of said arms extends from each of said elongate components of said second portion, and wherein said barb portion extends outwardly therefrom in a direction away from said bight portion.

9. A receptacle according to claim 7, wherein said barb portion includes a leg, said leg having a first limb extending outwardly in the direction away from said bight portion, and a second limb carried by said first limb and extending towards said bight portion.

10. A receptacle according to claim 9, wherein said limbs have a junction and wherein said junction between said two limbs of said barb portion is curved in two planes so as to provide for a smooth engagement of said barb portion with the other face of said support, to prevent damage to said face.

11. A receptacle according to claim 7, further including a lazy-S shaped curved portion and wherein said bight portion is attached to said second portion by said lazy-S shaped curved portion to provide a shoulder to engage one side of said aperture on installation of said receptacle.

12. A receptacle according to claim 9, wherein said second limb of said barb portion is adapted to provide a free end forming a guide surface for said stud.

* * * * *